(12) United States Patent
Martinez

(10) Patent No.: US 9,635,968 B1
(45) Date of Patent: May 2, 2017

(54) CURTAIN ROD MOUNTING SYSTEM

(71) Applicant: Michael L. Martinez, Simi Valley, CA (US)

(72) Inventor: Michael L. Martinez, Simi Valley, CA (US)

( * ) Notice: Subject to any disclaimer, the term of this patent is extended or adjusted under 35 U.S.C. 154(b) by 0 days.

(21) Appl. No.: 14/940,594

(22) Filed: Nov. 13, 2015

(51) Int. Cl.
*A47B 96/06* (2006.01)
*A47H 1/142* (2006.01)
*A47H 1/022* (2006.01)
*A47H 1/102* (2006.01)
*A47H 1/122* (2006.01)
*F16M 13/02* (2006.01)

(52) U.S. Cl.
CPC .............. *A47H 1/142* (2013.01); *A47H 1/022* (2013.01); *A47H 1/102* (2013.01); *A47H 1/122* (2013.01); *F16M 13/025* (2013.01)

(58) Field of Classification Search
CPC ........... A47H 1/10; A47H 1/102; A47H 1/104
See application file for complete search history.

(56) References Cited

U.S. PATENT DOCUMENTS

| 1,599,183 | A | * | 9/1926 | Phillips | B60J 3/0208 |
|---|---|---|---|---|---|
| | | | | | 248/220.1 |
| 1,818,776 | A | | 8/1931 | Wintrob | |
| 2,911,176 | A | * | 11/1959 | Roediger | A47H 1/022 |
| | | | | | 248/220.1 |
| 2,927,762 | A | | 3/1960 | Owsiak | |
| 3,889,912 | A | * | 6/1975 | Ray | A47H 1/14 |
| | | | | | 248/255 |
| 4,889,305 | A | * | 12/1989 | Mahan | A47H 1/102 |
| | | | | | 248/253 |
| 5,421,551 | A | | 6/1995 | LeClaire | |
| 6,325,349 | B1 | * | 12/2001 | Breaux | A47H 1/10 |
| | | | | | 248/262 |
| 6,382,295 | B1 | | 5/2002 | Nicholson | |
| 6,840,482 | B2 | | 1/2005 | Downey et al. | |
| 7,028,960 | B2 | | 4/2006 | Goldstein | |
| 7,543,624 | B2 | | 6/2009 | Rodriguez | |
| 8,201,789 | B1 | | 6/2012 | Chon | |
| 2007/0056700 | A1 | | 3/2007 | Hemmady | |

\* cited by examiner

Primary Examiner — Amy Sterling

(57) ABSTRACT

A curtain rod mounting system includes a support surface that has a pair of faces. Each of the faces forms a right angle with respect to each other. A pair of curtain rods is provided. A suspension unit is removably attached to the support surface. The suspension unit engages each of the faces such that the suspension unit bisects the right angle. Each of the curtain rods removably engages the suspension unit such that each of the curtain rods is oriented to be coextensive with an associated one of the faces.

15 Claims, 5 Drawing Sheets

CURTAIN ROD MOUNTING SYSTEM

BACKGROUND OF THE DISCLOSURE

Field of the Disclosure

The disclosure relates to mounting devices and more particularly pertains to a new mounting device for mounting a pair of curtain rods in an inside corner of a wall.

SUMMARY OF THE DISCLOSURE

An embodiment of the disclosure meets the needs presented above by generally comprising a support surface that has a pair of faces. Each of the faces forms a right angle with respect to each other. A pair of curtain rods is provided. A suspension unit is removably attached to the support surface. The suspension unit engages each of the faces such that the suspension unit bisects the right angle. Each of the curtain rods removably engages the suspension unit such that each of the curtain rods is oriented to be coextensive with an associated one of the faces.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
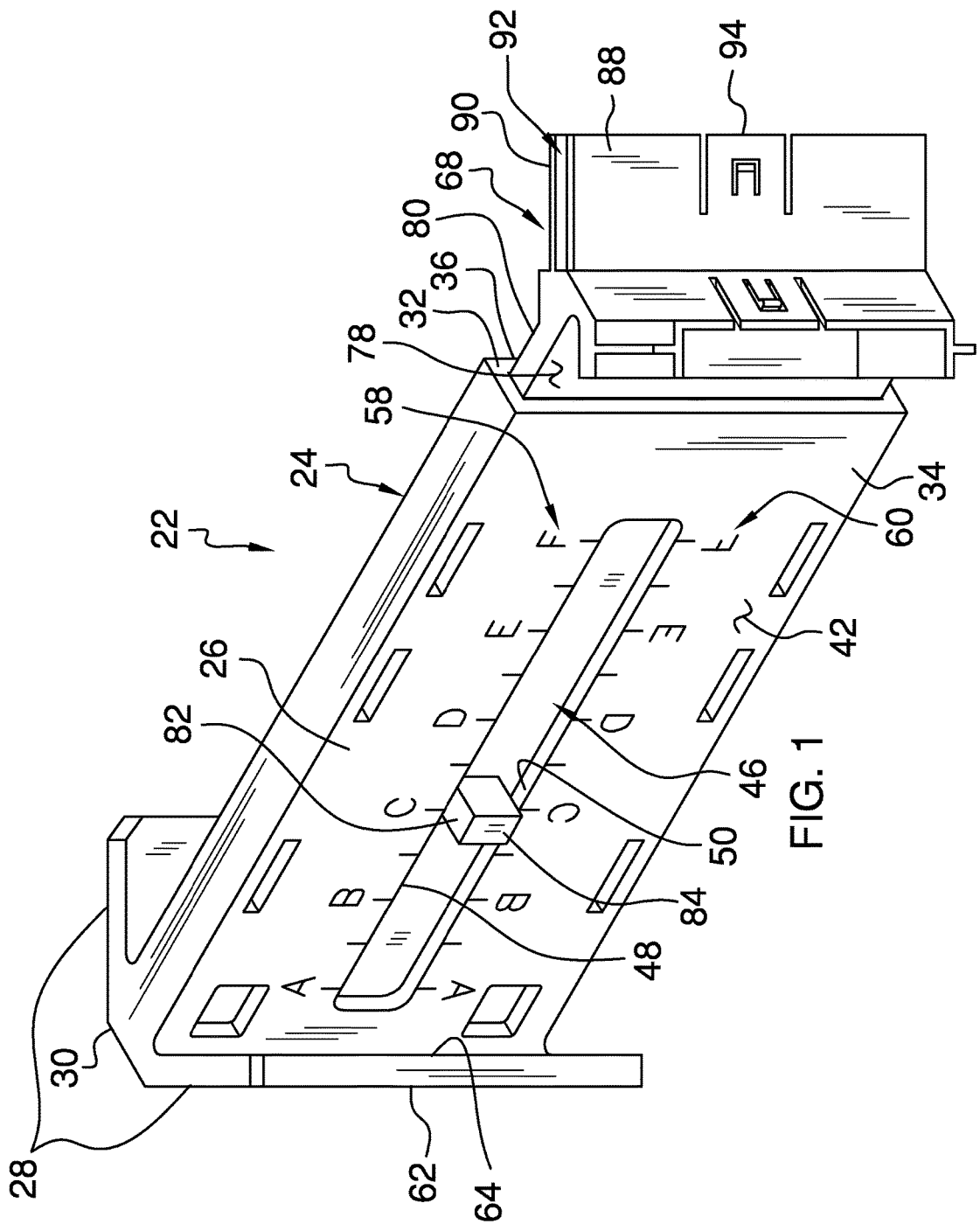
FIG. 1 is a front perspective view of a curtain rod mounting system according to an embodiment of the disclosure.
Figure 2:
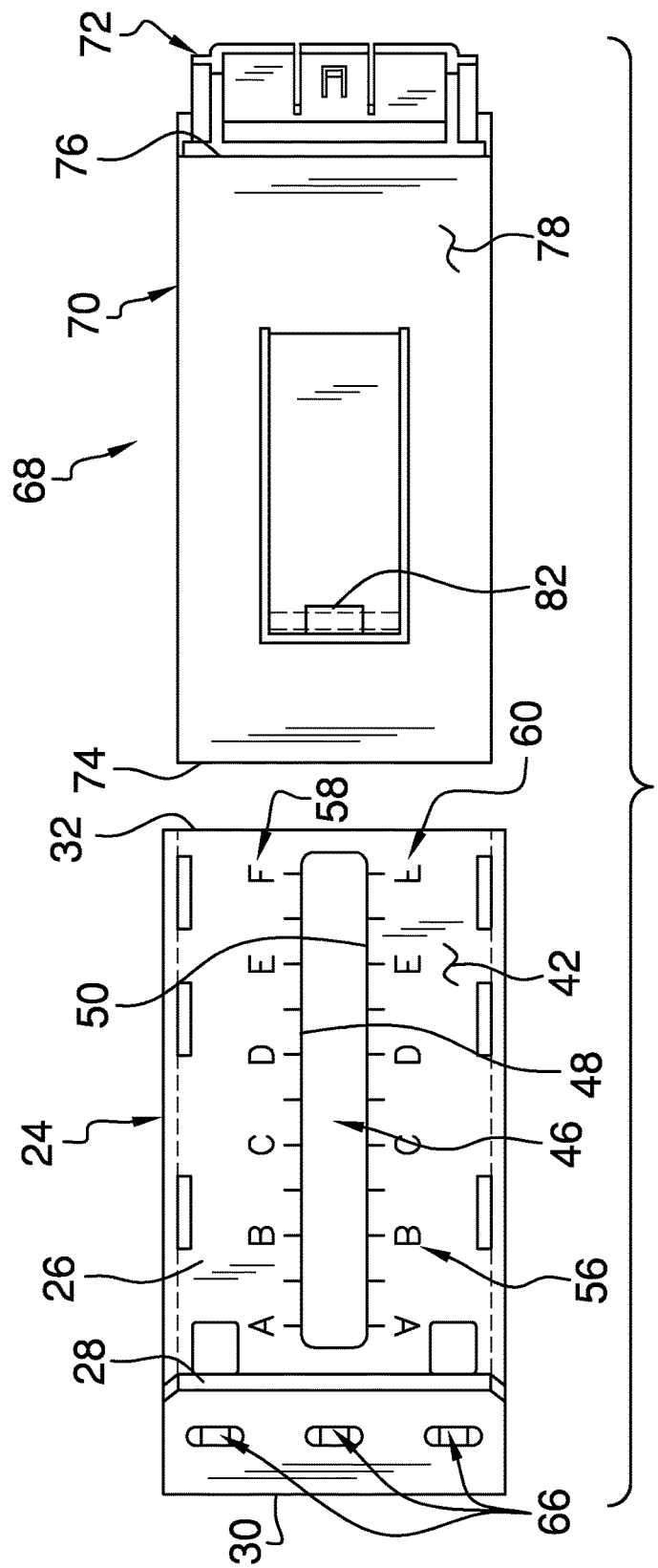
FIG. 2 is a front exploded view of an embodiment of the disclosure.
Figure 3:
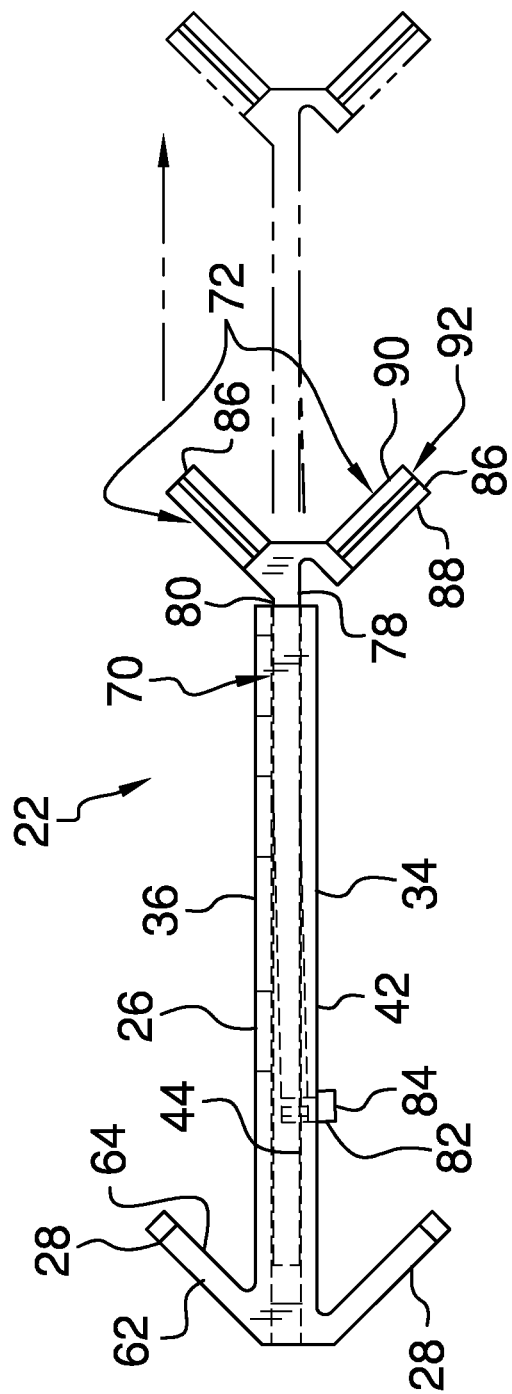
FIG. 3 is a top view of an embodiment of the disclosure.
Figure 4:
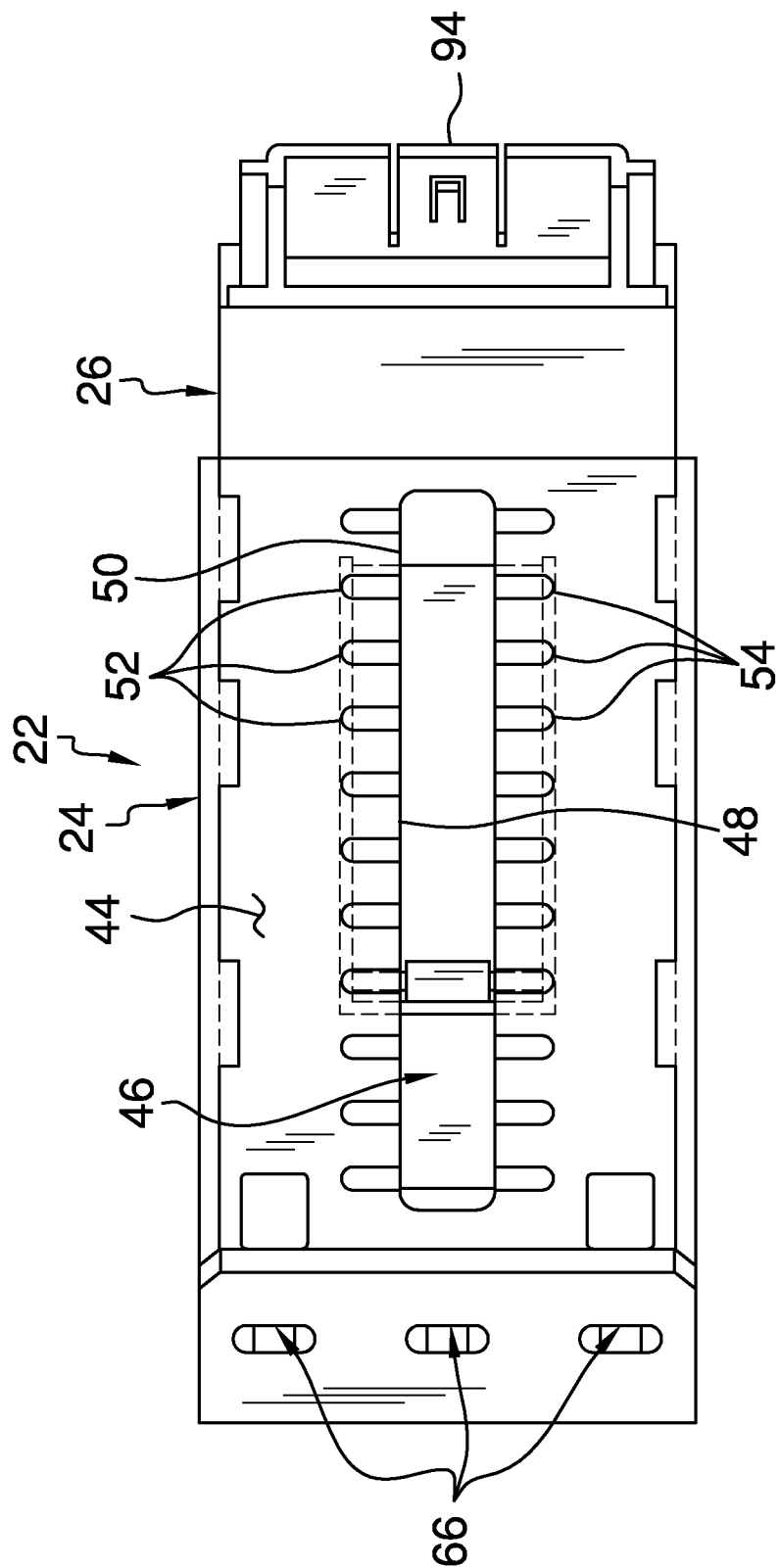
FIG. 4 is a back phantom view of an embodiment of the disclosure.
Figure 5:
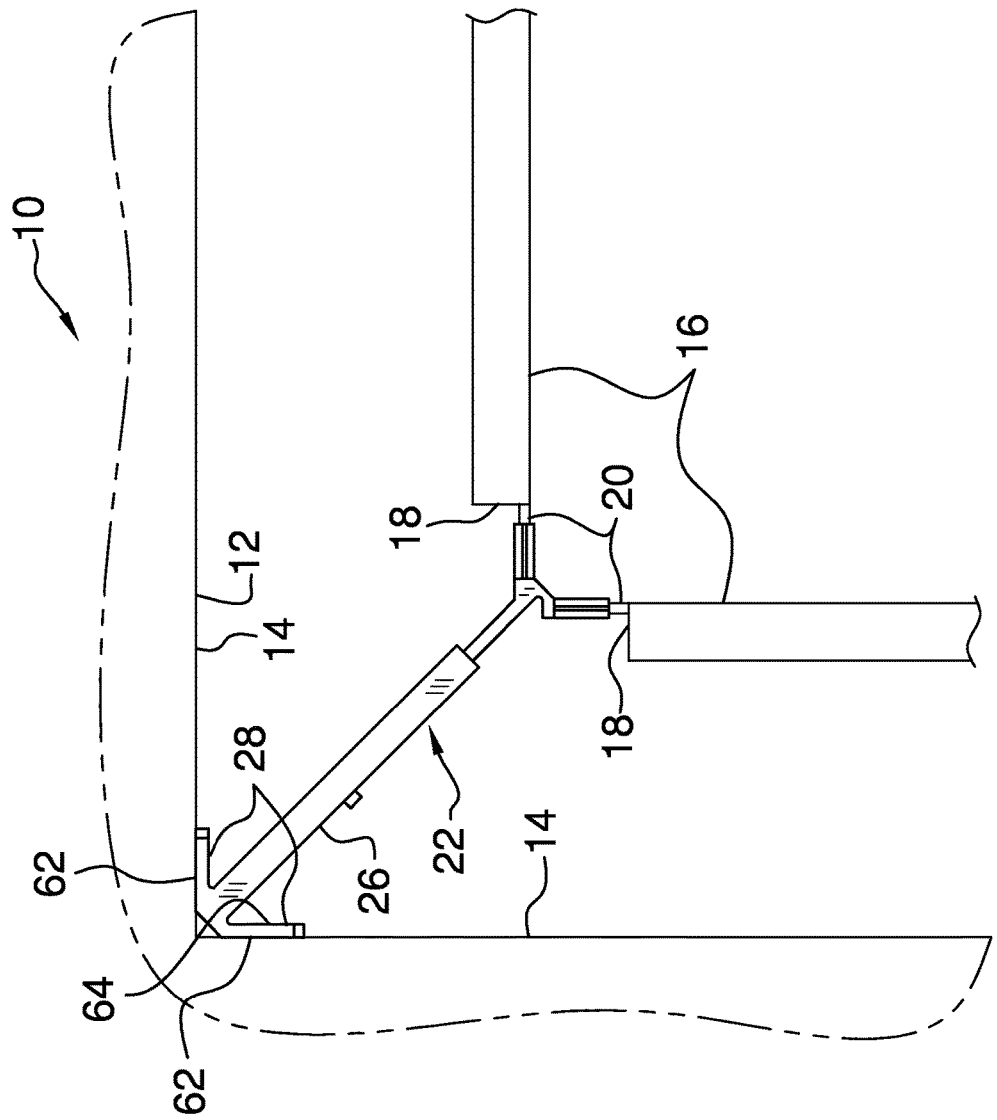
FIG. 5 is a perspective in-use view of an embodiment of the disclosure.

With reference now to the drawings, and in particular to FIGS. 1 through 5 thereof, a new mounting device embodying the principles and concepts of an embodiment of the disclosure and generally designated by the reference numeral 10 will be described.

As best illustrated in FIGS. 1 through 5, the curtain rod mounting system 10 generally comprises a support surface 12 that has a pair of faces 14. Each of the faces 14 forms a right angle with respect to each other. The support surface 12 comprises a wall in a building or the like. A pair of curtain rods 16 is provided and each of the curtain rods 16 has a first end 18. Each of the curtain rods 16 has a hook 20 that is coupled to the first end 18.

A suspension unit 22 is provided and the suspension unit 22 is removably attached to the support surface 12. The suspension unit 22 engages each of the faces 14 such that the suspension unit 12 bisects the right angle. Each of the curtain rods 16 removably engages the suspension unit 22. Thus, each of the curtain rods 16 is oriented to be coextensive with an associated one of the faces 14.

The suspension unit 22 comprises a first mount 24 that is removably attached to the support surface 12. The first mount 24 has a body 26 and pair of wings 28. The body 26 has a first end 30, a second end 32, a first lateral wall 34, a second lateral wall 36, a top edge 38 and a bottom edge 40. The second end 32 is open and the body 26 is substantially hollow. The first lateral wall 34 has an outer surface 42 and an inner surface 44. The body 26 may have a length ranging between approximately twelve cm and fifteen cm and a height ranging between five cm and eight cm. Each of the wings 28 may have a length ranging between three cm and six cm.

The first lateral wall 34 has a first slot 46 extending through the inner surface 44 and the outer surface 42. The first slot 46 extends substantially between the first end 30 and the second end 32. The first slot 46 is centrally positioned on the first lateral wall 34. The first slot 46 has an upper bounding edge 48 and a lower bounding edge 50. The inner surface 44 has a plurality of first grooves 52 extending outwardly therein and each of the plurality of first grooves 52 extends upwardly from the upper bounding edge 48. The plurality of first grooves 52 is spaced apart from each other and is distributed along the upper bounding edge 48.

The inner surface 44 has a plurality of second grooves 54 extending outwardly therein and each of the plurality of second grooves 54 extends downwardly from the lower bounding edge 50. The plurality of second grooves 54 is spaced apart from each other and is distributed along the lower bounding edge 50. Each of the second grooves 54 is aligned with an associated one of the first grooves 52.

The outer surface 42 has indicia 56 printed thereon. The indicia 56 comprise a first row of indicia 58. The first row of indicia 58 is coextensive with the upper bounding edge 48. The indicia 56 comprise a second row of indicia 60. The second row of indicia 60 is coextensive with the lower bounding edge 50. Each of the first row of indicia 58 and the second row of indicia 60 may comprise letters. The letters indicate a selectable length of the suspension unit 22.

Each of wings 28 is attached to and extends away from an associated one of the first lateral wall 34 and the second lateral wall 36. Each of the wings 28 forms a forty five degree angle with respect to an associated one of the first lateral wall 34 and the second lateral wall 36. Each of the wings 28 is positioned on the first end 30 and each of the wings 28 has a primary surface 62 and a secondary surface 64. The primary surface 62 of each of the wings 28 engages the associated one of the faces 14 such that the body 26 bisects the right angle of the support surface 12.

Each of the wings 28 has a plurality of second slots 66 extending through the primary surface 62 and the secondary surface 64. The second slots 66 on an associated one of the wings 28 is spaced apart from each other and distributed along each of the associated wing 28. A plurality of fasteners may each be extended through an associated one of the second slots 66 to engage the support surface 12. Thus, the suspension unit 22 is retained on the support surface 12. The body 26 is offset between the pair of wings 28 with respect to a line extending through the first end 30 and the second end 32. Thus, the first lateral wall 34 has a length that is greater than a length of the second lateral wall 36.

A second mount 68 is provided and the second mount 68 has a frame 70 and a pair of flaps 72. The frame 70 has a first end 74, a second end 76, a first surface 78 and a second surface 80. The second end 32 of the body 26 insertably receives the first end 74 of the frame 70. Thus, the second mount 68 is slidably coupled to the first mount 24. The frame 70 may have a length ranging between approximately twelve cm and fifteen cm and a height ranging between five cm and eight cm. Each of the flaps 72 may have a length ranging between three cm and six cm.

The first surface 78 of the frame 70 has a tab 82 extending outwardly therefrom. The tab 82 releasably engages a selected one of the first grooves 52 and a selected one of the second grooves 54. Thus, the suspension unit 22 is retained at a selected adjustable length. The tab 82 has a distal end 84 with respect to the first surface 78. The tab 82 extends outwardly from the first slot 46. Thus, the distal end 84 may be selectively manipulated thereby facilitating the tab 82 to disengage from the selected first groove 52 and the selected second groove 54.

Each of the flaps 72 is coupled to and extends away from the second end 76 of the frame 70. Each of the flaps 72 forms a forty five degree angle with respect to an associated one of the first surface 78 and the second surface 80. Each of the flaps 72 has a distal end 86 with respect to the frame 70. Each of the flaps 72 has a first wall 88 and a second wall 90. The first wall 88 of an associated one of the flaps 72 is spaced from the second wall 90 of the associated flap 72 to define a hook space 92 in each of the flaps 72. The hook space 92 extends between the distal end 86 of an associated one of the flaps 72 and the frame 70.

The first wall 88 of each of the flaps 72 has a lock portion 94. The hook space 92 in each of the flaps 72 insertably receives the hook 20 corresponding to an associated one of the curtain rods 16. Thus, each of the curtain rods 16 is coextensive with an associated one of the flaps 72. The lock portion 94 of each of the flaps 72 releasably engages the hook 20 corresponding to the associated curtain rod 16. Thus, each of the curtain rods 16 is releasably retained on the suspension unit 22. The lock portion 94 may be manipulated outwardly with respect to the hook space 92 thereby facilitating the associated curtain rod 16 to be removed from the suspension unit 22.

In use, the first mount 24 is coupled to the support surface 12. The tab 82 is manipulated and the second mount 68 is slidably positioned to extend a selected distance from the first mount 24. The hook 20 on each of the curtain rods 16 is inserted into the hook space 92 of an associated one of the flaps 72. Thus, each of the curtain rods 16 is oriented to be coextensive with an associated one of the faces 14 of the support surface 12. Each of the curtain rods 16 is spaced from the support surface 12. The suspension unit 22 facilitates the curtain rods 16 to form a right angle corresponding to the right angle formed by the support surface 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A curtain rod mounting system comprising:
   a support surface having a pair of faces, each of said faces forming a right angle with respect to each other;
   a pair of curtain rods; and
   a suspension unit being removably attached to said support surface, said suspension unit engaging each of said faces such that said suspension unit bisects said right angle, each of said curtain rods removably engaging said suspension unit such that each of said curtain rods is oriented to be coextensive with an associated one of said faces, said suspension unit comprising a first mount being attached to said support surface, said first mount having a body, said body having a first end and a second end, said suspension unit further comprising a second mount, said second mount having a frame and a pair of flaps, said frame having a first end, a second end, a first surface and a second surface, said second end of said body insertably receiving said first end of said frame such that said second mount is slidably coupled to said first mount.

2. The system according to claim 1, wherein each of said curtain rods has a first end, each of said curtain rods having a hook being coupled to said first end.

3. The system according to claim 1, further comprising said first mount having a pair of wings, said body having a first lateral wall, a second lateral wall, a top edge and a bottom edge, said second end being open, said body being substantially hollow, said first lateral wall having an outer surface and an inner surface.

4. The system according to claim 3, wherein said first lateral wall has a first slot extending through said inner surface and said outer surface, said first slot extending substantially between said first end and said second end, said first slot being centrally positioned on said first lateral wall, said first slot having an upper bounding edge and a lower bounding edge.

5. The system according to claim 4, wherein:
   said inner surface having a plurality of first grooves extending outwardly therein, each of said plurality of first grooves extending upwardly from said upper bounding edge, said plurality of first grooves being spaced apart from each other and being distributed along said upper bounding edge; and
   said inner surface having a plurality of second grooves extending outwardly therein, each of said plurality of second grooves extending downwardly from said lower bounding edge, said plurality of second grooves being spaced apart from each other and being distributed along said lower bounding edge, each of said second grooves being aligned with an associated one of said first grooves.

6. The system according to claim 4, wherein said outer surface has indicia being printed thereon, said indicia comprising a first row of indicia, said first row of indicia being coextensive with said upper bounding edge, said indicia comprising a second row of indicia, said second row of indicia being coextensive with said lower bounding edge.

7. A curtain rod mounting system comprising:
a support surface having a pair of faces, each of said faces forming a right angle with respect to each other;
a pair of curtain rods;
a suspension unit being removably attached to said support surface, said suspension unit engaging each of said faces such that said suspension unit bisects said right angle, each of said curtain rods removably engaging said suspension unit such that each of said curtain rods is oriented to be coextensive with an associated one of said faces;
wherein said suspension unit comprises a first mount being attached to said support surface, said first mount having a body and pair of wings, said body having a first end, a second end, a first lateral wall, a second lateral wall, a top edge and a bottom edge, said second end being open, said body being substantially hollow, said first lateral wall having an outer surface and an inner surface; and
each of wings is attached to and extending away from an associated one of said first lateral wall and said second lateral wall, each of said wings forming a forty five degree angle with respect to an associated one of said first lateral wall and said second lateral wall, each of said wings being positioned on said first end, each of said wings having a primary surface and a secondary surface, said primary surface of each of said wings engaging said associated one of said faces such that said body bisects said right angle of said support surface.

8. The system according to claim 7, wherein each of said wings has a plurality of second slots extending through said primary surface and said secondary surface, said second slots on an associated one of said wings being spaced apart from each other and distributed along each of said associated wing.

9. A curtain rod mounting system comprising:
a support surface having a pair of faces, each of said faces forming a right angle with respect to each other;
a pair of curtain rods;
a suspension unit being removably attached to said support surface, said suspension unit engaging each of said faces such that said suspension unit bisects said right angle, each of said curtain rods removably engaging said suspension unit such that each of said curtain rods is oriented to be coextensive with an associated one of said faces;
wherein said suspension unit comprises a first mount being attached to said support surface, said first mount having a body and pair of wings, said body having a first end, a second end, a first lateral wall, a second lateral wall, a top edge and a bottom edge, said second end being open, said body being substantially hollow, said first lateral wall having an outer surface and an inner surface; and
said body being offset between said pair of wings with respect to a line extending through said first end and said second end such that said first lateral wall has a length being greater than a length of said second lateral wall.

10. The system according to claim 1, wherein:
said body has a plurality of first grooves and a plurality of second grooves; and
said first surface of said second mount having a tab extending outwardly therefrom, said tab releasably engaging a selected one of said first grooves and a selected one of said second grooves such that said suspension unit is retained at a selected adjustable length.

11. The system according to claim 10, wherein:
said body has a first slot; and
said tab has a distal end with respect to said first surface, said tab extending outwardly from said first slot wherein said distal end is configured to be selectively manipulated thereby facilitating said tab to disengage from said selected first groove and said selected second groove.

12. The system according to claim 1, wherein each of said flaps is coupled to and extending away from said second end of said frame such that each of said flaps forms a forty five degree angle with respect to an associated one of said first surface and said second surface, each of said flaps having a distal end with respect to said frame.

13. The system according to claim 12, wherein each of said flaps has a first wall and a second wall, said first wall of an associated one of said flaps being spaced from said second wall of said associated flap to define a hook space in each of said flaps, said hook space extending between said distal end of an associated one of said flaps and said frame.

14. The system according to claim 13, wherein:
each of said curtain rods has a hook; and
said first wall of each of said flaps has a lock portion, said hook space in each of said flaps insertably receiving said hook corresponding to an associated one of said curtain rods such that each of said curtain rods is coextensive with an associated one of said flaps, said lock of each of said flaps releasably engaging said hook corresponding to said associated curtain rod such that each of said curtain rods is releasably retained on said suspension unit.

15. The system of claim 1, further comprising:
each of said curtain rods having a first end, each of said curtain rods having a hook being coupled to said first end; and
said suspension unit comprising:
said first mount having a pair of wings, said body having a first lateral wall, a second lateral wall, a top edge and a bottom edge, said second end being open, said body being substantially hollow, said first lateral wall having an outer surface and an inner surface, said first lateral wall having a first slot extending through said inner surface and said outer surface, said first slot extending substantially between said first end and said second end, said first slot being centrally positioned on said first lateral wall, said first slot having an upper bounding edge and a lower bounding edge, said inner surface having a plurality of first grooves extending outwardly therein, each of said plurality of first grooves extending upwardly from said upper bounding edge, said plurality of first grooves being spaced apart from each other and being distributed along said upper bounding edge, said inner surface having a plurality of second grooves extending outwardly therein, each of said plurality of second grooves extending downwardly from said lower bounding edge, said plurality of second grooves being spaced apart from each other and being distributed along said lower bounding edge, each of said second grooves being aligned with an associated one of said first grooves, said outer surface having indicia being printed thereon, said indicia comprising a first row of indicia, said first row of indicia being coextensive with said upper bounding edge, said indicia comprising a second row of indicia, said second row of indicia being coextensive with said lower bounding edge, each of wings being attached to and extending away from an associated one of said first lateral wall and said second lateral wall, each of said wings forming a forty five degree angle with respect to an associated one of said first lateral wall and said second lateral wall, each of said wings being positioned on said first end, each of said wings having a primary surface and a secondary surface, said primary surface of each of said wings engaging said associated one of said faces such that said body bisects said right angle of said support surface, each of said wings having a plurality of second slots extending through said primary surface and said secondary surface, said second slots on an associated one of said wings being spaced apart from each other and distributed along each of said associated wing, said body being offset between said pair of wings with respect to a line extending through said first end and said second end such that said first lateral wall has a length being greater than a length of said second lateral wall, and said first surface of said second mount having a tab extending outwardly therefrom, said tab releasably engaging a selected one of said first grooves and a selected one of said second grooves such that said suspension unit is retained at a selected adjustable length, said tab having a distal end with respect to said first surface, said tab extending outwardly from said first slot wherein said distal end is configured to be selectively manipulated thereby facilitating said tab to disengage from said selected first groove and said selected second groove, said flaps being coupled to and extending away from said second end of said frame such that each of said flaps forms a forty five degree angle with respect to an associated one of said first surface and said second surface, each of said flaps having a distal end with respect to said frame, each of said flaps having a first wall and a second wall, said first wall of an associated one of said flaps being spaced from said second wall of said associated flap to define a hook space in each of said flaps, said hook space extending between said distal end of an associated one of said flaps and said frame, said first wall of each of said flaps having a lock portion, said hook space in each of said flaps insertably receiving said hook corresponding to an associated one of said curtain rods such that each of said curtain rods is coextensive with an associated one of said flaps, said lock of each of said flaps releasably engaging said hook corresponding to said associated curtain rod such that each of said curtain rods is releasably retained on said suspension unit.

\* \* \* \* \*